United States Patent [19]

Corthout et al.

[11] Patent Number: 4,631,690

[45] Date of Patent: Dec. 23, 1986

[54] MULTIPROCESSOR COMPUTER SYSTEM FOR FORMING A COLOR PICTURE FROM OBJECT ELEMENTS DEFINED IN A HIERARCHIC DATA STRUCTURE

[75] Inventors: Marc E. A. Corthout; Pieter M. Mielekamp, both of Eindhoven, Netherlands

[73] Assignee: U.S. Philips Corporation, New York, N.Y.

[21] Appl. No.: 589,264

[22] Filed: Mar. 13, 1984

[30] Foreign Application Priority Data

Mar. 10, 1982 [NL] Netherlands .................... 8300872

[51] Int. Cl.$^4$ .................... G06F 15/40; G06F 15/626; G09G 1/14
[52] U.S. Cl. .................... 364/518; 364/521; 364/526; 340/747
[58] Field of Search .................... 364/518, 520, 521; 340/724, 727, 747

[56] References Cited

U.S. PATENT DOCUMENTS

| 3,602,702 | 8/1971 | Warnock | 364/521 X |
| 3,816,726 | 6/1974 | Sutherland et al. | 364/518 X |
| 3,889,107 | 6/1975 | Sutherland | 364/518 X |
| 4,208,810 | 6/1980 | Rohner et al. | 364/521 X |

OTHER PUBLICATIONS

Giloi, "Bezier Approximation of Curves," *Interactive Computer Graphics*, pp. 134–140, 1978.

Newman et al, "Bezier Methods," *Principles of Interactive Computer Graphics*, pp. 315–320, 1979.

Primary Examiner—Errol A. Krass
Assistant Examiner—Joseph L. Dixon
Attorney, Agent, or Firm—Jack E. Haken; James J. Cannon, Jr.

[57] ABSTRACT

A multiprocessor system for forming a color picture from object elements defined in a hierarchic data structure. The object elements are Bezier polygons each of the sides of which forms a Bezier curve. There is provided an array of parallel connected point processors which perform three functions. First of all, from the highest level of the data structure they determine the relevance of each object element to a point in question until either irrelevance is detected or one or more elementary object elements remain. Furthermore, for each point and each relevant elementary object element a binary inside/outside determination is made. Finally, the color is implemented by a priority determination of the elementary object elements determined to be "inside". The inside/outside decision is made in that during successive steps the relevant polygon sides are divided and in that the contribution to the inside/outside determination by the parallelogram diagonalized by the current side portion is decided. The number of intersections of a semi-infinite straight line with respect to the sides of the polygon in question ultimately decides the inside/outside determination.

12 Claims, 23 Drawing Figures

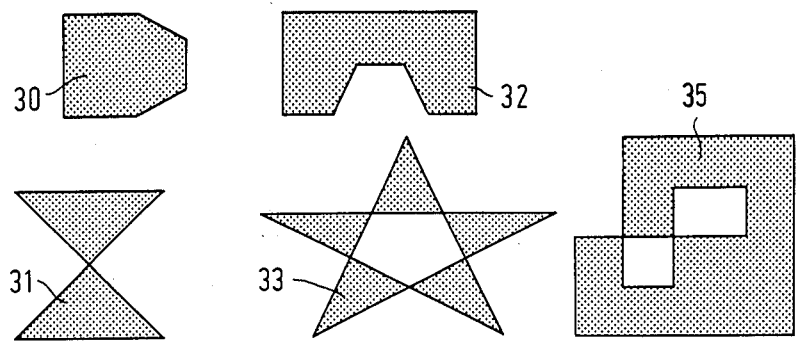
FIG.1a
$$P(u) = \sum_{i=0}^{n} \binom{n}{i} u^i (1-u)^{n-i} \cdot p_i$$
$n=1 \quad p_0(1-u) + p_1(u)$
$n=2 \quad p_0(1-u)^2 + 2p_1(u)(1-u) + p_2 u^2$
$n=3 \quad p_0(1-u)^3 + 3p_1(u)(1-u)^2 + 3p_2 u^2(1-u) + p_3 u^3$
FIG.1b
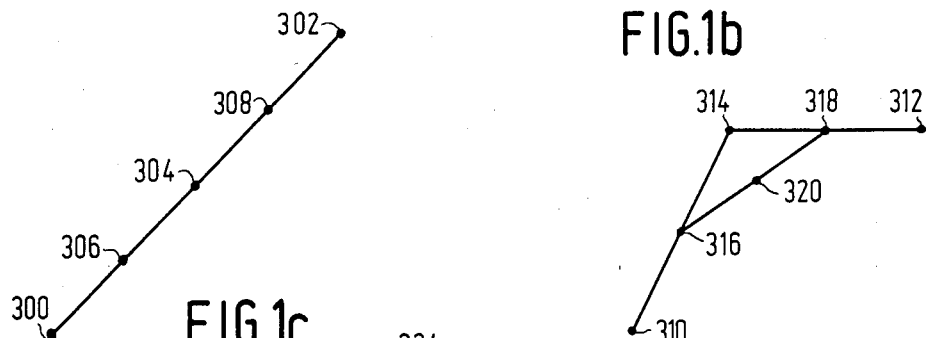
FIG.1c
FIG.1d
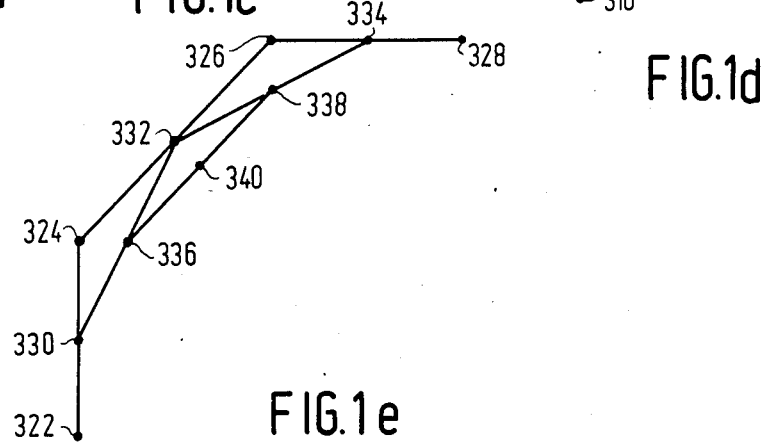
FIG.1e

```
200  Let G = P₀,......,Pₙ
     B, in, at := {(Pⱼ, Pⱼ₊₁) | i = 0,......,N-1}, false, false
     While B ≠ φ ∧ ¬at
       Let (Q,R) ∈ B; B := B \ {(Q,R)}
       if INBOX1(Q,R)
205      if P = Q v P = R
           at := true
         else
           Let f(Q,R) = E₁,......,Eₘ ; stop,q,r := false,1,m
           While ¬stop
210          Let p = r - q
             Case
               p ≤ 1
                 stop := true
                 if(max {xₑq, xₑₙ} = xₚ) ∧ (max {yQ, yR} > yₚ)
215              in := ¬in
               p > 1
                 Let t ∈ {q+1,......,r-1}   {{e.g., t = (q+r)÷2}}
                 if P = Eₜ
                   at, stop := true, true
220              else
                   Case
                     INBOX 1(Eq, Eₜ)
                       r := t
                     INBOX 1(Er, Eₜ)
225                    q := t
                     otherwise
                       stop := true
                       if INBOX 2(Q,Eₜ) v INBOX 2(R,Eₜ)
                         in := ¬in
230    else
         if INBOX 2(Q,R)
           in := ¬in
     Return in v at
```

FIG.8

$$\left[\# \{k \in \{0,\ldots,n-1\} | l \in \{0,\ldots,n-1\}: [(y_k - y_p) * (y_{k \oplus l} - y_p) = -1 \wedge \forall i=1,\ldots,(l-1)[x_{k \oplus i} < x_p \wedge y_{k \oplus i} = y_p]]\} \bmod 2\right] = 1$$
FIG.9a
Variables:
B: bag of pairs of points
in, at, stop: boolean
q, r: integer
FIG.9b
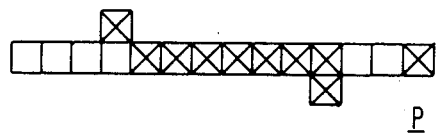
FIG.10a
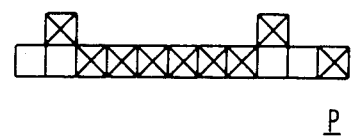
FIG.10b
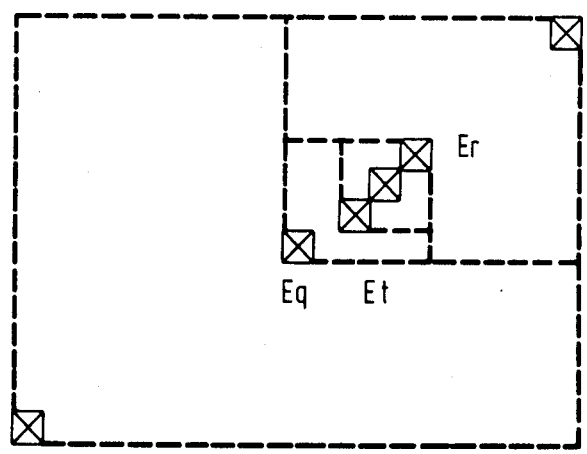
FIG.10c
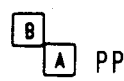 PP
FIG.10d
 PP
FIG.10e
 P P P P
FIG.10f

MULTIPROCESSOR COMPUTER SYSTEM FOR FORMING A COLOR PICTURE FROM OBJECT ELEMENTS DEFINED IN A HIERARCHIC DATA STRUCTURE

BACKGROUND OF THE INVENTION

1. Field of the Invention

The invention relates to a multiprocessor computer system for forming a picture from object elements which are defined in a hierarchic data structure, said system comprising a connection for a host processor in order to receive therefrom the data of the object elements for storage in an input memory, and a point processor system which is fed by the input memory in order to calculate from the data structure of the object elements the pixel data per picture for output on a connection for a display member.

2. Description of the Prior Art

The general state of the art is as described in the book by W. M. Newman and R. F. Sproull: Principles of interactive computer graphics, ISBN 0-07-046338-7, McGraw Hill, 1979. This book describes differently organized data structures inter alia on pages 137-142; a hierarchic data structure is shown in the FIGS. 10-11. Furthermore, on page 421, FIGS. 26-4, a multiprocessor system of the kind set forth is disclosed; this system comprises inter alia a central processor, a matrix multiplier and a display processor. Appendix I, pages 481-489, contains a survey of vectors and matrices. Pages 315-320 describe the formation and the use of so-called Bezier curves which will be described in detail hereinafter.

Object elements are to be understood to mean herein quantitative models of flat or spatial entities such as surfaces, bodies and complex structures. These object elements will be described in detail with reference to the FIGS. 1a-1e. The advantage of a hierarchic structure consists in that an object element which is situated at a lower level of the hierarchic structure can be simply modified without the entire structure being modified; moreover, it is also advantageous that object elements defined at a lower level can often also be used again at a higher level. The latter holds good for a two-dimensional reproduction situation where exclusively linear transformations occur in the rendering process. The host processor produces relative transformations between the object elements, such as relative or absolute positions. The host processor can also supply new object elements or remove existing object elements. It is a problem of the known technique that often it is first necessary to determine which part of the object elements is situated within the display window, i.e. the so-called "clipping". It will be demonstrated that in the procedures to be disclosed hereinafter clipping is performed only at the end of the treatment of the point in question, said point being temporarily considered as being the center of a system of coordinates. In a simple case the pixels can be generated synchronously with the scanning of the picture in the display member. The display member may operate, for example on the basis of a line-wise scanned television picture tube; however, it may alternatively concern a matrix of multicolor LED or plasma elements or an ink-jet printer. The invention is restricted to a completely scanned display member for each pixel. The invention notably does not concern so-called vector-generated pictures which entirely consist of written vector lines and in which the scanning sequence may be arbitrary.

SUMMARY OF THE INVENTION

It is an object of the invention to achieve fast generating of the pixels by using an array of simple processors and without very intense traffic being required between the host processor and the array of processors or between the processors themselves. These processors treat the points in application space that correspond with the pixels on the screen or hardcopy. Normally, this is a one-to-one correspondence; however sometimes one pixel is mapped to several points in application space (e.g. for anti-aliasing.) Therefore, we prefer the term "point processor" over "pixel processor". This object is achieved in accordance with the invention in that an elementary level of the data structure comprises object elements in the form of Bezier polygons which are exclusively defined by the describing points of the polygon sides, said Bezier polygons being linked per next-higher hierarchic level by relative transformations so as to form elements of a higher hierarchic level until at a highest hierarchic level there is formed a two-dimensional coherence structure which is stored in the input memory in the form of object elements and planar relative transformations. The point processor system comprises an array of parallel point processors which are connected to the input memory via an input network, each point processor generating pixels for a group of pixels on the display member, each pixel being assigned to one of the point processors, the groups forming a mutually regular positioning pattern. Each point processor is operative on the one hand as a structure processor for determining for a predetermined pixel, for each level and starting from the highest hierarchic level of the data structure, the associated application coordinates within the object elements of that level until either the object element in question is found to be irrelevant for the pixel in question or one or more elementary object elements are reached, each point processor on the other hand acting, the elementary object elements being defined as said polygons, as a polygon processor for calculating for each predetermined pixel for each relevant polygon a binary inside/outside information in order to form for the pixel in question a list of valid elementary object elements for which the "inside" information is applicable with the associated color information, each point processor also acting as a priority processor for determining from said list, on the basis of priority information valid for each elementary object element, the color to be implemented for the pixel in question, the connection for the display member featuring a cyclic multiplexer for receiving, by way of cyclic interrogation, the color signals formed by the point processors.

The invention is based on the idea that it is attractive to repeat similar and simple calculations per pixel, for which purpose less complex but more specific and hence faster components suffice. Moreover, the processing is started at the highest level of the hierarchic data structure; it has been found that this processing direction results in a simple processing structure. The foregoing is notably so if each point processor acts on only a group of pixels of the total picture, so that a high degree of parallelism is achieved and hence the processing speed is increased.

Preferably, in the polygon processor per polygon side there is implemented an iterative decision structure wherein per iteration step the locations of a parallelogram which is generated by a polygon side or polygon side portion which is situated at least partly within the picture are compared with the location of the current point for which a decision is to be taken, the polygon side or the polygon side portion being divided in case the point is situated within the parallelogram until one of the following situations occurs: during an elementary iteration step coincidence is detected between the point and the newly generated point on the curve (ATSIDE), or the current point is situated outside any newly formed parallelogram, or non-coincidence between the point and the curve is detected in an elementary iteration step, the number of intersections of all sides of the relevant polygon with respect to a semi-infinite straight line through the current point being counted and in the latter two situations, the information "enclosed" being formed for the point in question in the case of an odd number, the information "inside" data being formed from said information "enclosed". It has been found that this iteration operation can be simply implemented, certainly if the division is simplified to halving in the case of straight polygon sides; the iteration converges very quickly on average. Preferably, said coincidence also generates said information "inside", but otherwise said information "outside" being formed. The contour of the polygon is thus considered to form part of the "inside" area; on the other hand; this contour can alternatively be considered to form part of the "outside" area. An attractive implementation is achieved for a display member where the pixels are organized in rows and columns, the sides of said parallelogram extending parallel to the rows and the columns, said semi-infinite straight line extending parallel to one of the sides. The testing in the point processors is thus simplified.

Preferably, the array of point processors is divided into sub-arrays, per sub-array there being provided an auxiliary memory, all point processors within a sub-array acting on a common sub-picture, between the input memory and the auxiliary memories which are connected thereto via a cyclic demultiplexer, there being connected a reduction processor in order to determine from the hierarchic data structure the relevance of the object element in question for the sub-picture in question, each time level-wise successively from the highest hierarchic level downwards until irrelevance is detected or until an elementary object element is reached so as to transfer to the relevant auxiliary memory only the part of the data structure for which at least an elementary object element contained therein has been detected as being relevant, as well as the set of elementary object elements having been detected as being relevant. Parallelism is thus achieved in two levels, so that the processing speed is substantially increased at limited costs. The part of the hierarchic data structure to be processed by each point processor is now limited, so that the processing speed of the point processors is substantially increased. Thanks to the limited size of the part of the data structure to be processed, it can also be multiplied without objection: a given object element may be simultaneously present in a plurality of auxiliary memories. Thanks to the introduction of auxiliary memories, each point processor need appeal only rarely to the input memory. Competitive and unpredictable rear operations in the input memory, initiated by the point processors, are thus avoided. Moreover, the point processors need not communicate with one another, so that the data supply structure is simplified; for example, neither interrupt mechanisms are required between the point processors nor is arbitration required between different requesting processors, so that mutual blocking of different requesting processors is also precluded.

Preferably, said relevance is determined on the basis of at least partial coincidence between the relevant sub-picture and a rectangular bounding box which is stored in the input memory per object element of the data structure and which encloses the object element in question. Such rectangular bounding boxes result in simple arithmetical processing, so that the processing speed can be increased.

Between the array of point processors and the display member there is preferably connected a double picture buffer which comprises an input section for receiving color information concerning a complete picture from the point processors, and an output section for storing the color information concerning a complete picture for output to the display member until the input section, after having been completely filled with the information of a complete picture, is switched-over so as to act as the output section, the output section acting as such thus far then being switched over so as to act as the input section. A continuous display can thus be achieved, because a picture once stored can be scanned a number of times. Flicker etc. are then avoided.

Preferably, each elementary object element in the input memory comprises a priority indication. This represents a simple implementation. The priority indication may be a number; for example, lower numbers then have priority over higher numbers.

For the display of a three-dimensionally organized data structure in central projection or parallel projection, for the elementary object elements which are defined therein as said polygons an implicit priority indication is preferably given by the equation parameters of the plane which at least partly contains the elementary object element in question. In the case of polygons which locally overlap after projection on the picture plane, the parameter values of the points of intersection of the locally associated planes with respect to the straight lines along the projection direction, as expressed in parametric form, and through the relevant projection point, explicitly provide the relative priority upon comparison. This comparison need be activated in the priority processors only if an overlap between two elementary object elements is detected in the structure/polygon processors. Moreover, thus no restrictions are imposed in the sense that concave polygons or mutually intersecting polygons would not be permissible.

Using simple means, the invention thus implements pixel-oriented operations which have proved to be difficult thus far, for example, the combination (mixing) of different colors in accordance with a priority rule. In a two-dimensional situation, the priority need no longer be determined by a definition of sequence but can be chosen independently for each elementary object element. A three-dimensional situation does not require sorting algorithms which are difficult to implement between the object elements as such; the priorities can be simply derived by a point-wise organized calculation. Furthermore, anti-aliasing algorithms can be readily implemented by consideration of a local group of points in application coordinates.

BRIEF DESCRIPTION OF THE FIGURES

The invention will be described in various sections hereinafter, that is to say successively, the hierarchic data structure of the object elements, the successive phenomenological operations on these object elements, a general description of the computer system, the operations in the reduction processor, the operations in the polygon processor, the construction of a polygon processor, and additions for a three-dimensional situation.

FIG. 1a shows some examples of elementary object elements bounded by straight lines;

FIGS. 1b–1e show details concerning the formation of so-called Bezier polygons whose sides may be formed by higher-order Bezier curves;

FIG. 8 shows a program for the processing operations in a polygon processor;

FIGS. 9a, 9b show some associated formula in the form of a figure;

FIGS. 10a–10f illustrate some possibilities for the program of FIG. 8;

DESCRIPTION OF THE PREFERRED EMBODIMENT

Object Elements and Data Structure

Figure 2:
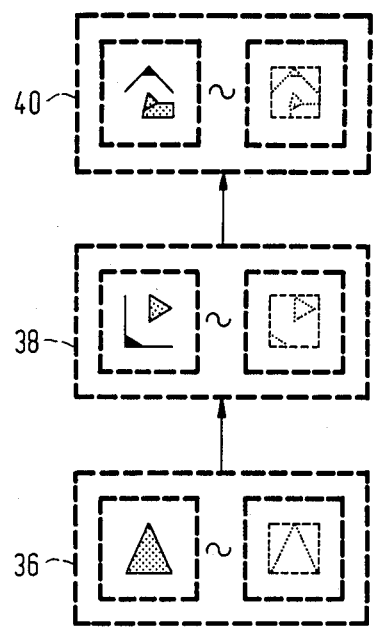
FIG. 2 shows an example of a branch of a hierarchic data structure of object elements.

FIG. 1 shows some examples of elementary object elements which are composed of straight lines; for the sake of simplicity, first a planar situation will be considered. Element 30 is a convex polygon which may be incorporated in the data structure as a string of data which successively represent: the name of the object in the form of an identifier which also indicates the number of corner points, in this case "six", followed by a row of seven corner point data, that is to say the starting corner point, the next corner point encountered when proceeding clock-wise (or counter-clockwise) and the successive further corner points until as the last point the starting corner point is encountered for the second time. Each corner point is given by its relative coordinates with respect to a reference point within the object elements in which the relevant elementary object element is defined. The method of data storage at the system level in the source memory, for example, in a segment organization, is not specific to the invention and will not be elaborated herein. The shading serves to indicate that the relevant polygon has an interior area of given color. The exterior area may either be colorless or may have a different color. In the latter case the interior area of the polygon may have the background color. The contour of the polygon is considered to form part of the interior area in the present example. This is an arbitrary choice, however. Furthermore, the data of the relevant polygon also includes priority information. When two polygons have a point in common in the interior area, the polygon of low priority may be covered by a polygon of higher priority. However, alternatively a mixed color may be produced. It is to be noted that only two colors are of relevance for the polygon in question and that no lines with quasi-infinitely small width occur. When a line is to be represented in a picture, it is realized as a narrow polygon. This offers the advantage that as the scale is further reduced, the relevant line will automatically become increasingly thinner and will ultimately disappear due to undersampling, without an additional algorithm being required for the treatment of (contour) lines.

Similarly, element 32 is a polygon which comprises eight corners and which is partly concave. For the remainder the same remarks are applicable as given with reference to the element 30.

Element 31 represents another category of polygons. It may be denoted on the one hand as a hexagon comprising two coincident corner points; this polygon is treated in the same way as the already described polygons. On the other hand the relevant polygon may also be denoted as a quadrangle comprising two intersecting sides. The color of the interior area, including the contour, may differ in both cases from that of the exterior area.

Similarly, element 33 may be denoted as a pentagon; as is indicated, part of the enclosed area is defined as a non-interior area, because no shading is used. The same has been done for the element 35. It will be evident that other conventions are feasible for the coloring of such complex polygons by using an algorithm other than that incorporated in the preferred embodiment. Notably the contour of a polygon may be given the background color.

FIGS. 1b–1e show details concerning the formation of so-called Bezier polygons whose sides may be formed by higher-order Bezier curves. FIG. 1b shows the formula of such Bezier curves; further details concerning the phenomenological behaviour of these curves are given in said publication. A Bezier curve of the order n=1 is a straight line segment between the points p0 and p1 which act as terminal points. These points are the describing points of this line segment in the terminology used herein. The third and the fourth line show Bezier curves of the second order and the third order, respectively. On the third line p0 and p2 are the terminal points of a parabola; the point p1 is not situated on the parabola. p0 and p3 on the fourth line are the terminal points of the curve; the points p1, p2 are not situated on the curve. The line segments which connect the terminal points to the directly subsequent/preceding describing point are tangent to the curve. It has been found that these curves have a high descriptive power. FIG. 1c illustrates the formation of a first-order Bezier curve. The two describing points are 300 and 302. The line segment is divided into two equal parts by the point 304. The halves are divided into two equal parts by the points 306 and 308, respectively. FIG. 1d shows the formation of a second-order Bezier curve. The three describing points are 310, 312 and 314; these three points thus define two first-order Bezier curves. The line segments are divided into two equal parts by the points 316, 318. The line segment formed by the latter points is divided into two equal parts by the point 320. It can be demonstrated that the latter point is a point of the relevant second-order Bezier curve. By repeating the described operations, a series of points can be defined which divide the relevant Bezier curve into ever smaller parts; this is because the points 310, 316 and 320 form the describing points of a first half of the Bezier curve which coincides with the Bezier curve defined by the points 310, 314 and 312. FIG. 1e illustrates the formation of a third-order Bezier curve. The four describing points are 322, 324, 326, 328. The line segments defined by successive pairs of describing points are divided into two equal parts by the points 330, 332, 334. This process is repeated by the points 336, 338. The line segment described by the last two points is divided into two equal parts by the point 340. It can be demonstrated that the latter point is again a point of the relevant third-order Bezier curve and also that the Bezier curves defined by the point series 322, 330, 336, 340 and 340, 338, 334, 328 together are identical to the Bezier curve defined by the point series 322, 324, 326, 328. The halving points of the Bezier curves, so the points 304, 306, 308, 320, 340 in the cases shown, are used to perform an iterative operation in the polygon processor to be described hereinafter. Flat figures can be formed from the described polygon sides. In conformity with the conventional polygons shown in FIG. 1a, these polygons are referred to as Bezier polygons. They may be composed of Bezier curves of equal or different order.

A line segment as shown in FIG. 1c diagonalizes a parallelogram which is completely given if the directions of the sides are given. Similarly, the describing points of a Bezier curve as shown in FIGS. 1d/1e also generates a parallelogram if the directions of the sides are given; this parallelogram is the smallest parallelogram containing all describing points of the relevant Bezier curve. Due to the convex hull property of Bezier curves, evidently, all points on a Bezier curve are situated within the parallellogram generated by the describing points thereof. For the specification of a polygon side by the describing points, the order of the curve is specified in the input memory.

It is to be noted that the shape of the curves also depends on the sequence of the describing points. From a concatenation of a number of Bezier curves a Bezier polygon can be formed in the same manner as a conventional polygon from a concatenation of straight line segments. In the preferred embodiment described hereinafter, the Bezier curves must be monotonic with respect to both coordinate directions. If this is not so, a curve may be divided into portions, each of which satisfies the requirement imposed. For a Bezier curve comprising no more than four describing points the condition that all describing points must be situated within the rectangle generated by the terminal points has to be satisfied. This simplifies the algorithm. Said publication also discloses the formation of surfaces (curved or not) as described by a mesh of Bezier control points.

The object elements may be subject to relative transformations. In a two-dimensional situation, these transformations are applicable, for example with respect to a reference system of coordinates:
  translation
  rotation
  scale variation (increase or decrease)
  mirroring with respect to a point or a straight line.

FIG. 2 shows an example of a branch of a hierarchic data structure of object elements. Each level is symbolically represented. The lowest level 36 comprises an isosceles triangle as an object element at the left, said triangle being given as the previously mentioned string of corner points. This object element comprises at the right a circumscribing rectangle as extra data (bounding box, in this case a square) of the isosceles triangle; this rectangle is given, for example as x-coordinates and y-coordinates of the rectangle sides with respect to the system of coordinates of the object element of next-higher order in which it is connected. The relevant rectangle is not unique for the triangle, because any relative orientation produces its own circumscribing rectangle. It is not necessary to take the smallest figure for a given orientation; usually, however, calculation time is thus saved. Notably in the case where the sides are formed by higher-order Bezier curves an "excessively large" circumscribing rectangle could be used. The elementary object element can again be stored in a conventional manner. The location of the isosceles triangle within the circumscribing rectangle is denoted by dotted lines, the rectangle itself consisting of broken lines.

At the next-higher hierarchic level 38 the isosceles triangle of the level 36 is combined with a hook-shaped structure, i.e. a polygon comprising very narrow portions for which the shading is not given. This hook-shaped structure is not shown as forming part of a lower hierarchic level in this case. At the right this combination is again shown within the associated circumscribing rectangle (again a square). The two elementary object elements can be combined by relative transformations of the described kind. The circumscribing rectangle of the combination can be determined in an elementary manner.

At the next-higher level 40 the object element of the level 38 is combined again with a polygon (pentagon); again a circumscribing rectangle is denoted by broken lines. The relations between the object elements within the data structure are represented, for example, by address pointers in the input memory.

Figure 3:
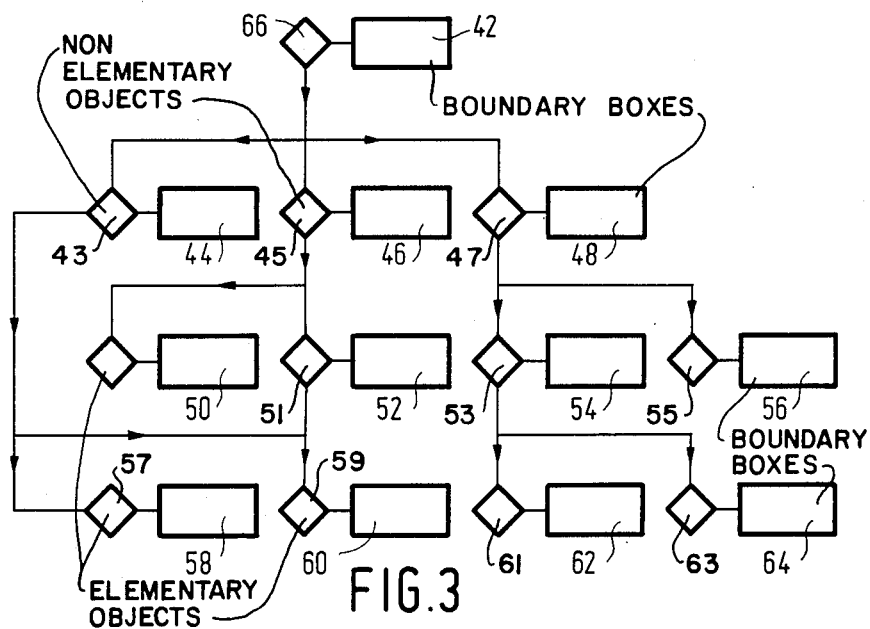
FIG. 3 shows a more detailed example of an hierarchic data structure.

FIG. 3 shows a second example of a hierarchic data structure of object elements. At the highest level, a diamond 66 with the associated circumscribing rectangle 42 represents a two-dimensional data structure; at the lower levels 44 . . . 64 are depicted as rectangular boxes and the elementary or non-elementary object elements are without number. At the next-lower level the coherence structure consists of three object elements (44, 46, 48). At the third level in the Figure, the object element 46 consists of constituent object elements 50, 52 and the object element 48 consists of object elements 54, 56. At the fourth level in the Figure, the object element 44 consists of object elements 50, 60, the object element 52 consists of object element 60, and the object element 54 consists of object elements 62, 64. The object elements 50 and 56–64 are to be considered elementary object elements. The fact whether or not an object element is elementary is determined only by its location within the hierarchic data structure, that is to say, if there is no lower level with respect to this object element. In a preferred embodiment, the data structure contains two kinds of constituents: first of all there are the actual object elements. Secondly there are the so-termed "calls": a call indicates the transformation between the reference of the calling or higher object element and the called or lower object element. A call is then omitted only for the elementary object elements, because it has been found that at the lowest level the relations are usually invariable; consequently, this situation differs slightly from that shown in FIG. 2 where rotation and scale variation occur also between the two lowest levels. For the sake of simplicity, the calls are considered to form part of the lower object element hereinafter. The sense of the above distinction between calls and object elements lies in the simplification of the multiple use of object elements.

General Description of the Computer System

The operations to be performed on the object elements will be described with reference to FIG. 4 which more or less symbolically represents the multiprocessor system. Block 68 is a random access memory which accommodates the hierarchic data structure, that is to say in a three-dimensional situation. In the case of, for example a flight simulator for pilots, this data structure represents the spatial "reality". A simpler situation often occurs in computer-aided design (CAD). In that case the perspective deformation can often be ignored so that use is made of parallel projection as opposed to the so-called central projection used in perspective systems. Block 70, being implemented in a computer, symbolizes the transformation of the data structure to a visual center, the method of projection not yet having been taken into account. The transformations thus determine the relative situation of the object element in question with respect to the visual center, expressed in the associated system of eye coordinates. The relevant facility may also form part of the host processor. In block 72 the reduction from the three-dimensional situation to the two-dimensional situation is performed. The block 72 is also implemented in a computer. Therein notably the projection of the object element is determined; this is given point-by-point directly by the transformation equations $x(p)=X''/Z''$, and $y(p)=Y''/Z''$, the double accent indicating the coordinates in the system of eye coordinates. This projection is stored as a (part of a) two-dimensional data structure in a random access memory 74. In two-dimensional cases, for example when the described system is used for the design of integrated circuits, this memory 74 directly contains the two-dimensional hierarchic data structure of the object elements so that the blocks 68, 70, 72 may be dispensed with. The blocks 68–72 may also form part of the host processor.

Block 76 represents a reduction processor whose operation will be described in detail hereinafter. Block 78 is an array of point processors which are connected to the reduction processor 76 by way of a demultiplexer structure which is represented only as a line branch. In this simple embodiment only four point processors are indicated. Point processor 80 consists of a memory 88 and the actual processor 90. The input/output control of the processor 80 and a bus structure for this purpose, if any, have been omitted for the sake of simplicity.

Figure 5:
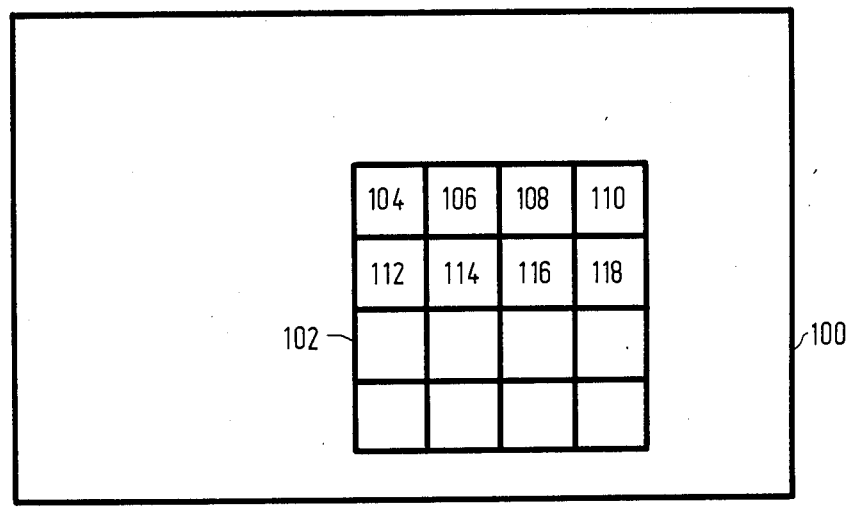
FIG. 5 shows the organization of a picture to be displayed within a two-dimensional display space.

FIG. 5 shows the organization of a picture within a two-dimensional display space. Box 100 represents the coordinate zone in which the highest hierarchic level of the data structure of the object elements is defined. Box 102 represents the coordinate zone thereof to be displayed. For the sake of simplicity, the principal directions of the boxes 100, 102 are chosen to correspond. It is assumed that the display member is a television picture tube with frame scanning, the line direction being horizontally directed in the picture. The box 102 comprises eight sub-boxes 104–118; the further division of the box is shown but not numbered. The reduction processor 76 performs the following reduction. For example, when the color data of the sub-box 104 is to be calculated, it is determined for all object elements, starting from the highest level of the hierarchic data structure, whether the circumscribing rectangle of the relevant object element has a point in common with the relevant sub-box. The constituent parts, given as object elements, of the relevant object element are subjected to the same test only if this is the case. If no common point is found, the relevant object element and the constituent object elements will be ignored. When an elementary object element has a point in common with the sub-box, the data of the object element in question, and also that of all object elements of hierarchic higher level in which the elementary object element is connected, is applied to the point processor provided to process the sub-box or a part thereof. The connection is achieved in that the relevant object element occurs as a part of a relative transformation. The FIGS. 7a, 7b show a flowchart for these operations which will be described in detail hereinafter.

Figure 6:
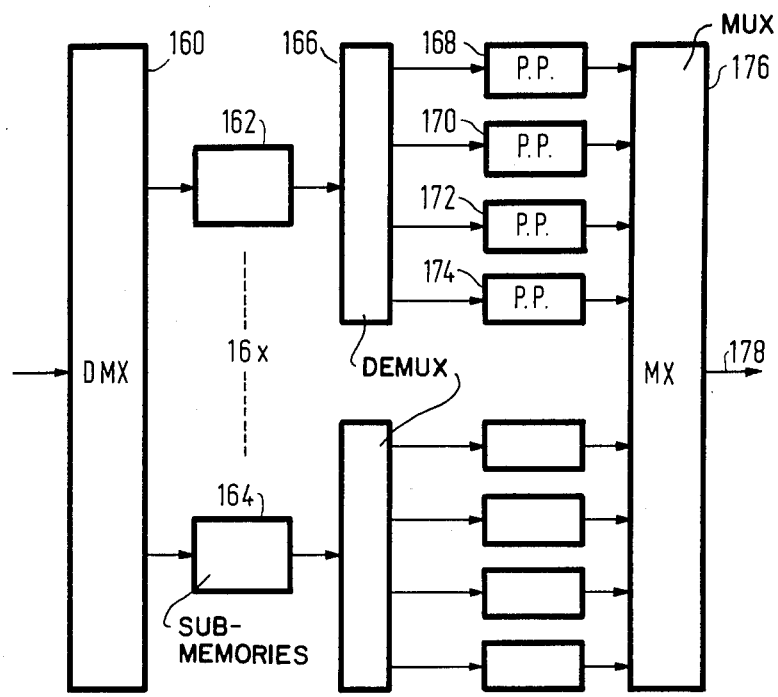
FIG. 6 shows a more detailed diagram of a milti-processor system.

FIG. 6 shows a more detailed diagram of a multiprocessor system. Block 160 represents a cyclic demultiplexer which is fed by the reduction processor via the arrow shown at the left. To the demultiplexer there are connected sixteen sub-memories, only the first (162) and the last (164) of which are indicated. Like in FIG. 5, the television picture is divided into sixteen vertical strips; each strip is divided into a fixed number (for example, sixteen) of sub-boxes which are situated next to each other. Consequently, there are 256 sub-boxes, of which one horizontal strip of 16 sub-boxes is processed concurrently. During a first sub-operation, the data which is relevant for the processing of the sub-boxes in question is transferred from the data structure to the relevant sub-memory. After the processing of the strip of sub-boxes, the data for the next strip of sub-boxes is determined and stored in the sub-memories. Element 166 is a secondary demultiplexer which makes the content of the sub-memory 162 available to a number of four point processors (168–174). Consequently, there are 64 processors for one complete picture. Within each sub-box each point processor acts on predetermined pixels; in a preferred embodiment, each time two television lines are processed within a sub-box, that is to say the pixel processor 168 acts on the left-hand part of the upper line, the point processor 170 on the right-hand part of the upper line, the point processor 172 on the left-hand part of the next line, and the point processor 174 on the right-hand part of said next line. Thus, after all point processors have completed the operation on the line parts assigned thereto, the complete color data of two television lines has been determined. Element 176 is a cyclic multiplexer which first interrogates all point processors which have operated on a portion of the first television line, and subsequently the point processors which have operated on a portion of the second television line. The data is transferred to the input section of the picture memory. When the data is applied in the correct sequence, the picture memory (element 92/94 in FIG. 4) may have a serial organization, for example utilizing charge transfer elements or magnetic domains. After all strips of the picture have been treated, the picture is treated again, if desired, the function of the input section and the output section in the display memory then being interchanged. Evidently, this makes sense only if the picture is thus modified, for example in that the location of the visual center is changed (so-called panning), in that the enlargement factor is changed (so-called zooming), or in that one or more object elements within the data structure are modified by displacement, by addition, or by removal. A static picture need be generated only once.

The Operations in the Reduction Processor

Figure 7A:
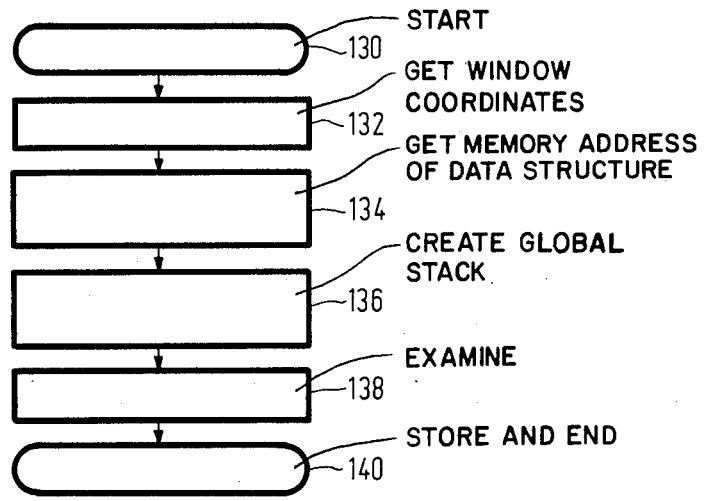
FIGS. 7a, 7b show a flowchart for the selection of object elements in a reduction processor.
Figure 7B:
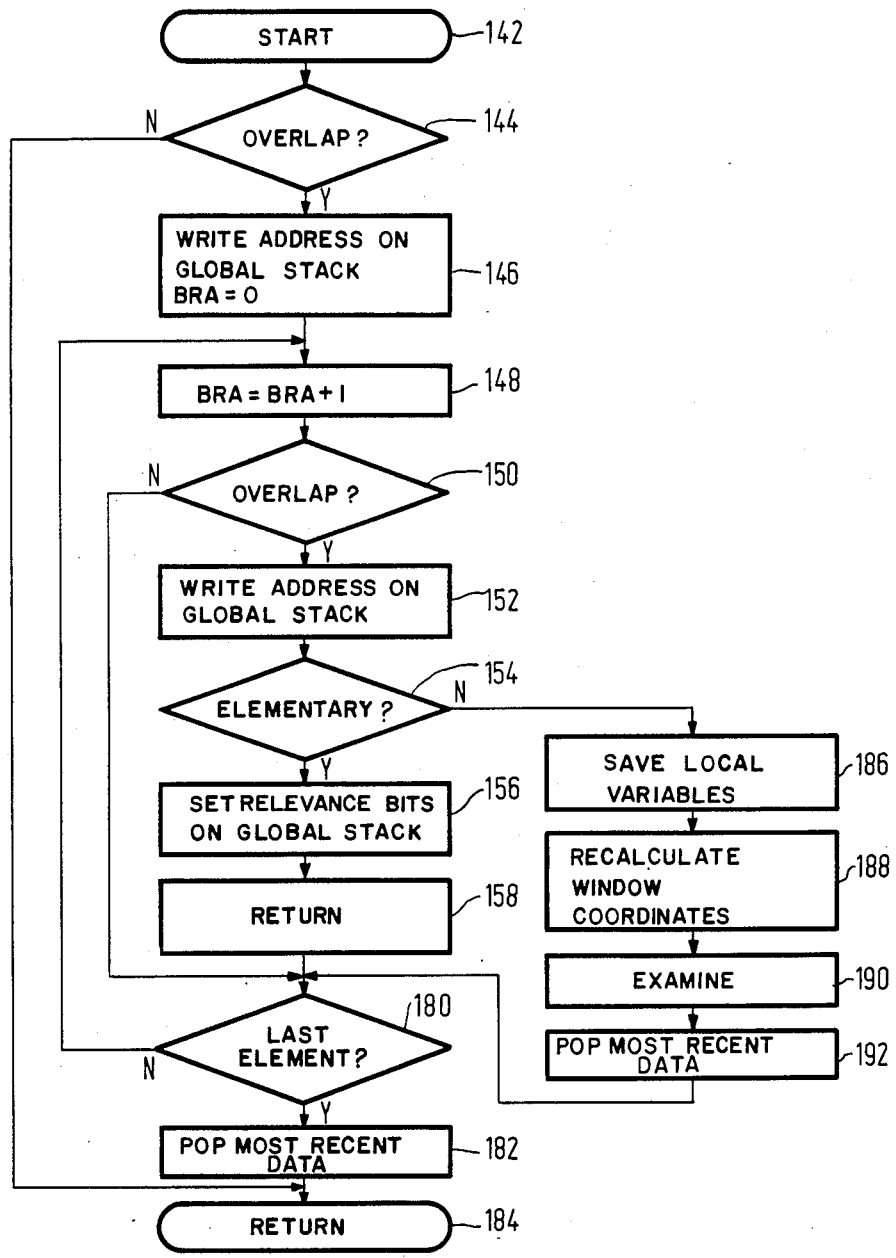

FIGS. 7a, 7b show a flowchart for the selection of the object elements as performed in the reduction processor and as can be performed in substantially the same way when the point processor acts as a structure processor. The operation is started in block 130; for example, the relevant procedure is addressed in a program memory and the variables are declared. In block 132 the coordinates of the left edge XL, the right edge XR, the upper edge YB and the lower edge YO are adjusted; these are the coordinates of the window which serve to determine, at the lowest level of the hierarchic data structure (on the global application coordinate system), whether the object element in question is relevant or not. The coordinates of the point in question are inserted in the structure processor. In block 134 the memory address of the hierarchic data structure to be treated is fetched, i.e. the address of the data structure of the highest level. All object elements comprise a bit indicating their relevance; all relevance bits are then reset. In block 136 a globally accessible stack is created. In block 138 the recursive procedure "examine" is addressed in order to perform the actual examination for determining whether or not the object elements are relevant. When the system leaves the first one of these procedures again, termination follows in block 140. All object elements whose relevance bits have been set are then transferred to the sub-memory in question. For the implementation of the structure processor, the relevant elementary object elements are subsequently treated in the polygon processor.

FIG. 7b illustrates the procedure "examine". In block 142 the procedure is started. In block 144 it is detected whether the sub-box to be examined overlaps the actual object element; in first instance the object element is the coherence structure of the highest level addressed in FIG. 7a. If no overlap exists, the system returns to the routine wherefrom the procedure in question was addressed: block 184. If an overlap is detected, the address of the actual object element is written on the global stack: block 146. Moreover, the auxiliary variable BRA is set to zero. This variable indicates the number of the next object element to be examined, i.e. the constituent object elements of the next-lower level; these object elements are numbered according to natural numbers. In block 148 the variable BRA is incremented and in block 150 it is detected whether or not overlap exists. If no overlap exists, it is detected in block 180 whether this was the last constituent object element of next-lower level of the current object element. If this was so, the most recent data is fetched from the global stack in block 182; this data will not be processed further. Should the global stack be completely empty in this case, a dummy operation is executed. In block 184 the system returns to the procedure having addressed the current one of the procedure "examine". Consequently, in given circumstances this is the procedure of FIG. 7a. If overlapping is detected in block 150, the address of the current, constituent object element is written on the global stack. In block 154 it is detected whether or not the latter was an elementary object element. If this is so, the complete data of the global stack is fetched and the relevance bits of all object elements referenced therein are set. The system subsequently returns to the block 180. If no elementary object element was being treated in block 154, the local variables of the process environment (a so-called run-time stack) are saved in block 186. These variables are at least the coordinates of the window (block 132), the coordinates derived therefrom by way of the transformations executed, and the current value of the variable BRA within the relevant one of the procedure "examine". In block 188 the window coordinates are recalculated, using the inverse of the relative transformations, for the object element in question for the next-higher object element, including the transformations meanwhile performed thereon (thus, the latter element was the current one at the instant at which the procedure entered the block 142). Subsequently, in block 190 the procedure "examine" is addressed again. When the system returns from the block 190, block 192 corresponds to the block 182 and the system proceeds to the block 180.

When all object elements have been treated, the elements whose relevance bits have been set must be considered further. In a simple realization, the system interrogates all object elements and each time examines the relevance bit. This can also be achieved by means of a second recursive procedure: "process"; this procedure will be described briefly. Instead of detecting the overlapping, this procedure detects the relevance bit. Instead of to the block 156/158, the object elements in question are transferred to the sub-memory. Block 188 is omitted and the remainder of the procedure is substantially the same as described with reference to FIG. 7b.

The Operation of the Point Processors

The operation of the array of point processors will now be described; reference is made to FIG. 4 for the sake of simplicity. When the auxiliary memory 88 within the processor 80 contains the relevant reduced data structure for the current sub-box (this data structure is organized hierarchically in the same way), the processing of the data may commence. For each point treated, the point processor follows the same procedure and successively acts as structure processor, polygon processor, and priority processor for the pixel in question. In principle these operations can also be performed in a different structure. For example, the polygon operations for a given polygon may start when it has been completely treated by the structure processor operations. The operations of the priority processor may commence with respect to the polygons for which the operations for the determination of the information "inside" and "outside" have been completely executed. The processor 90 may alternatively be composed of several sub-processors, each of which executes a part of the operations, depending on whether or not the required data is available. Multiprocessing is known per se and will not be elaborated herein for the sake of brevity. The operations required for the operation as a structure processor are performed in the same manner as the operations in the reduction processor, that is to say for a sub-box consisting of a single point. Consequently, only a single pair of coordinates (instead of 2) need be transformed and saved on the so-called "run-time stack". Moreover, in that case no alignment is required with respect to the axis of the new system of coordinates in the point processor, because only a single point is concerned. Finally, in the structure processor it is merely necessary to copy the (addresses of) relevant elementary object elements to the polygon processor, including any priority data for the priority processor.

The operations concerning the polygon processor will be described in detail hereinafter. The operations for the priority processor are usually simple: in a two-dimensional environment, each polygon to be colored is provided with its own priority number and in the case of overlapping simply the color of the highest priority number is assigned to be the "winner". Should several polygons have colors bearing the same priority number, a mixed color will be implemented. The formation of mixed colors is known per se. When the color to be implemented for a given pixel has been determined (as mentioned in the Summary, this may involve several points to be treated by the structure and polygon processor, e.g. in the case of anti-aliasing), the next pixel of the sub-box to be treated by the pixel processor in question is taken into consideration. When all pixels of a sub-box have been treated, the reduction processor 76 is reactivated in order to supply the data of a next sub-box. The color data thus formed is applied to a double buffer 92/94. The station 92 is an input section and is composed as a serial memory for the sake of simplicity, for example a number comprising 300-kbit modules, a number of which are arranged in parallel in order to store multi-bit data per pixel. For each pixel, for example, an eight-bit byte is output in parallel by the relevant point processor. The section 94 is a display section which has the same capacity as the input section. When all pixels of the box 102 have been treated, the functions of the display section and the input section are interchanged. The display member 96 is, for example, a conventional apparatus based on a television picture tube with 600 picture lines, on each of which 1000 pixels are calculated. The output network between the various point processors and the double buffer features a multiplex organization, so that the data of the colors defined by the point processors is output in the sequence in which the pixels in question are to be displayed on the display screen. The pixel-wise calculations do not require the same amount of time for each pixel and, moreover, the point processors must be cyclically interrogated in order to output the data in the correct sequence. Thus, the output of a point processor has a given intermediate buffer capacity which already stores given color data until this data must be made available to the double buffer.

The Operations in the Polygon Processor

FIG. 8 shows the operations to be implemented by the polygon processor in an algorithmic computer language; during these operations the sub-color information "inside" or "not inside" must be determined for a given point and for a given polygon. In this respect FIG. 9b declares some initial variables, that is to say a "bag" comprising pairs of points (so the same pair of points may occur a number of times), three boolean variables and two integers. A point is an element of a set of pairs of integers: point P has the coordinates (xP,xP). The distance "d" between two points is determined as the absolute value of the largest distance in a coordinate direction (x or y). A curve is formed as a string of points having a spacing which is each time equal to "1"; according to this definition, the number of points of the curve is referred to as the "length". Thus, a distance "1" corresponds to a length "2". The circumscribing rectangle of two points P,Q contains all pixels with $(x-xP)\cdot(n-xq)<1$, and similarly for the y-coordinate (actually, the product should at the most be equal to zero). The sum of two curves having a common terminal point is the concatenation of the curves by taking said terminal point into account only once. A so-called line drawing function of the points P, Q: "f(P,Q)" maps the points P and Q on the terminal points of a curve, all points of each sub-curve of said curve being situated within the circumscribing rectangle determined by the terminal points of said sub-curve. This condition is satisfied by only Bezier curves monotonic in the X and Y direction as shown in the FIGS. 1c-1e. The function of the y-coordinate as a function of the x-coordinate is either "non-ascending" or "non-descending"; the same is applicable to the x-coordinate as a function of the y-coordinate. For the algorithm described herein, only monotonic Bezier curves are admissible. When such curves occur, there is a simple solution, without approximation of the curve, in that a Bezier curve can be divided into parts for which the problem does not occur. A polygon "G" is a string of points which has coinciding terminal points without further restrictions being imposed as regards the other points. The "curve" of a polygon under a "line drawing function" is the sum of the curves of said line drawing function which are determined by the successive sides of the polygon. When a polygon consists of only one point, this curve is identical to said one point. For each triplet of the variables polygon G, line drawing function f, and point P, a first predicate ATSIDE is defined as well as a second predicate INSIDE, each of which may be "true" or "false". The first predicate is "true" if the relevant point coincides with a point which is indicated as being a sidepoint of the polygon by the line drawing function in question. The predicate "INSIDE" is "true" when the sum of the number of points of intersection of an arbitrary semi-infinite straight line from the relevant point with respect all of the polygon sides is odd. This semi-infinite straight line has the negative x-direction in the described embodiment. The predicate INSIDE is given in the form of a formula in FIG. 9a. An intersection is defined by two necessary conditions. The first condition is that two points k,k+1 of the polygon side must be situated at the next-higher or next-lower y-coordinate with respect to the origin P, so that the product of the differences of the y-coordinates has the value "−1". The second condition is that for all points of the polygon side between the points k and k+1 the x-coordinate must be smaller than that of the origin P and that the y-coordinate must be equal to that of the point P. FIG. 10a thus represents a situation in which a point of intersection is situated between the points k and k+1, while no intersection is involved in the situation shown in FIG. 10b. The total number of intersections of the semi-infinite straight line with respect to any of the polygon side must then be odd for an "inside" situation. The expression utilizes the symbol for modulo-x addition, x having the value n. When the symbol "smaller than" is used on the third line of FIG. 9a, the relevant semi-infinite straight line extends in the positive x-direction. When the number of intersections is odd, the predicate INSIDE is applicable. Finally, the color data is considered to be positive if either the predicate ATSIDE or the predicate INSIDE is true; this is the predicate INCLUDES. For a given polygon, point, and line drawing function, it is then necessary to determine the value of the predicate INCLUDES.

It can be demonstrated that the above predicates (where INCLUDES produces the ultimate inside/outside information) can be calculated as follows. To this end it is first necessary to define two intermediate predicates as follows:

The predicate INBOX1 between two points Q,R and a point P to be examined is true if the point in question is situated within a circumscribing rectangle which is defined by Q and R: $(xP-xQ)\cdot(xP-xR)<1$ and $(yP-yQ)\cdot(yP-yR)<1$; actually, the product should at the most be equal to zero. The predicate INBOX2 is true if the circumscribing rectangle determined by the points Q and R contains two points A and B for which it holds good that the point A at the left is situated on the same y-coordinate as the point P and the point B, being a neighbor of the point A, is situated on the next-higher y-coordinate. This inter alia means that the point P is situated neither on the left-hand side nor on the upper side of the circumscribing rectangle. FIGS. 10d-10f show a number of possibilities for a rectangle described by A and B; the predicate INBOX2 is "true" for each of these possibilities and each time some different positions of the point P are indicated. The predicate INSIDE can thus be simply tested, considering the requirements imposed on the line-drawing function.

The list of instructions of FIG. 8 is based on a bag of pairs of points B; double pairs are also permissible. There are also three bivalent auxiliary variables "in", "at", and "stop", and q and r are defined over the natural numbers. The list of FIG. 8 contains the following instructions. On line 200 the relevant polygon is declared. On line 201 the number of pairs of points is declared as determined each time by a relevant polygon side, the variables "in", "at" then becoming false. On line 202 the operations are started and continued until either all pairs of points of B have been treated, or the variable "at" has become "true". On line 203 two points Q,R are extracted from B. On line 204 it is detected whether the point P is situated within the rectangle defined by Q and R. If this is not so, the system follows the vertical straight line commencing at this point in order to resume on line 230. Similarly, the further vertical straight lines represent an iterative structure (nest). On line 205 it is detected whether the point P coincides with point Q or point R. If this is so, the variable "at" becomes "true". If the test result is negative, a series of m points is declared on line 208 by way of the curve which terminates in Q and R, using the line drawing function f. An auxiliary variable "stop" is made "false", and the sequence numbers q,r are assigned to the first and the last point, respectively, of the curve. For as long as the variable "stop" remains "false", the system continues. On line 210 the quantity p is made equal to the difference between q and r. There are now two cases. If p equals 0 or 1, the points Eq and Er are neighbors and the circumscribing rectangle determined thereby contains four pixels: the so-called elementary rectangle which in this case contains four points as a result of the previous test on the line 205. On line 213 it is indicated that a stop is made in any case. On line 214 it is tested whether none of the points Eq, Er is situated to the left of the point P, while at least one of the original terminal points Q and R is situated above the point P in the y-direction. If this is so, the value of the binary variable "in" is negated. FIGS. 10d-10f show some possibilities in this respect. However, if the distance between Eq and Er is larger, the line between Eq and Er is divided into two parts on line 217, for example it is halved subject to rounding off. If the point P coincides with this intermediate point Et, a stop is made on line 219; it has thus been detected that the relevant point is situated on the polygon side. If the result of the above test is negative, it is tested on the lines 224 whether point P is situated in one of the rectangles diagonalized by the point Et and one of the points Eq or Er, respectively. If this is so, the system returns to the line 209 (While), the other rectangle always (the point can never be simultaneously present in both rectangles during this test) is rejected, and the point Et takes the place of one of the points Eq, Er for the next iteration step. If the point P is not situated within one of the two circumscribing rectangles, a stop is made, but it is still tested whether the point would still render the predicate INBOX2 true with respect to the intermediate point and one of the terminal points. This predicate differs from INBOX1 and tests whether the line having the diagonal points of the rectangle as terminal points, is situated completely to the left of the point P, comprises at least one point having a larger y-coordinate, and at least one point having the same or a smaller y-coordinate than the point P. If the predicate INBOX2 is "true", the value of the variable "in" is negated. If the point P does not satisfy INBOX1 (Q,R) on line 204, the system arrives on line 230 and the test INBOX2 is also performed on the terminal points Q,R (line 231). Finally, on line 233 the result of the algorithm, that is to say the value of the variable "at", is returned. FIG. 10c shows a number of circumscribing rectangles which are denoted by broken lines; for the sake of simplicity, first-order Bezier curves are considered in this case. A large number of pixels need not be taken into account for the next division of a polygon side (portion). In other words, because of the logarithmic behavior of the division, the algorithm already converges after one or two steps for many pixels. It is to be noted that the algorithm given in FIG. 8 is applicable to first-order Bezier curves and that only for these curves there is the freedom to choose a factor which need not be equal to ½. The formation of the dividing points for higher-order Bezier curves has already been described with reference to the FIGS. 1d, 1e. For such higher-order Bezier curves the algorithm of FIG. 8 need be adapted only as regards this point, so that always some intermediate describing points must be memorized.

Realization of a Polygon Processor

Figure 11:
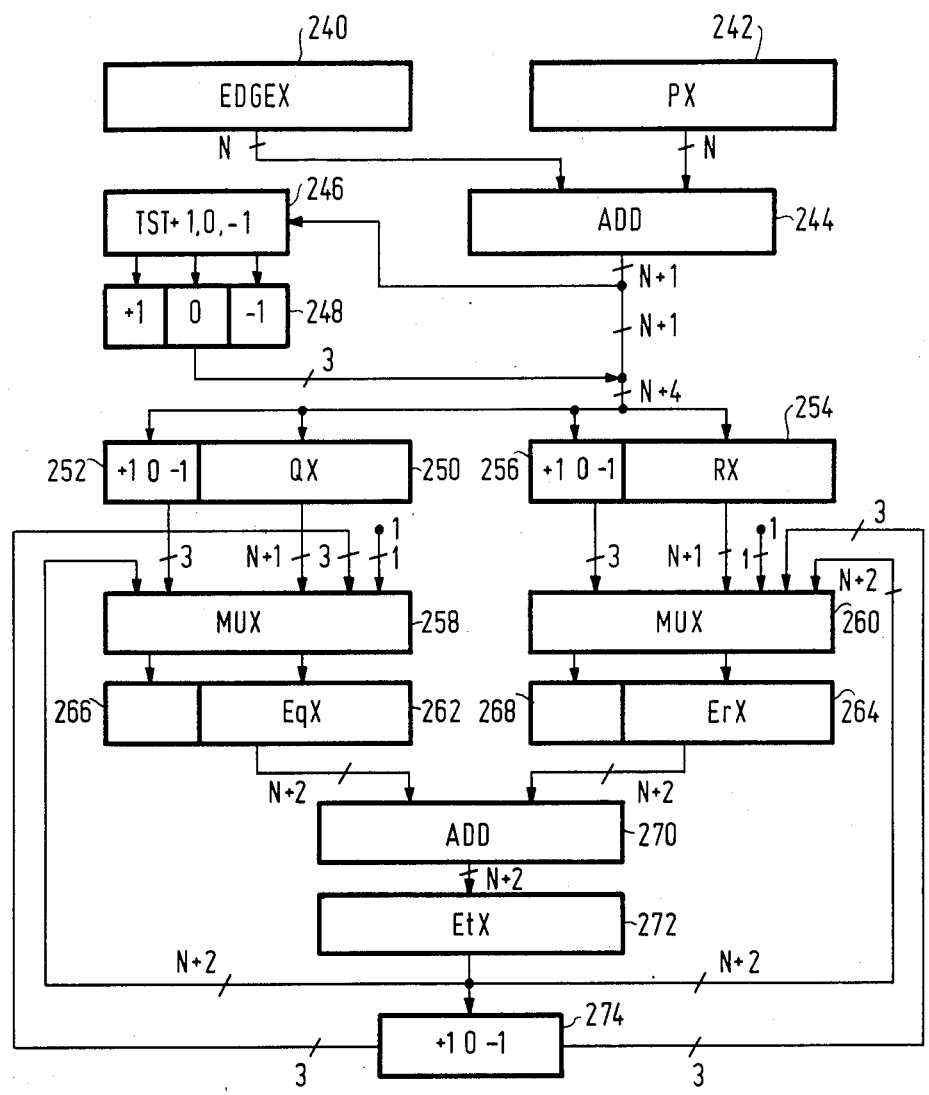
FIG. 11 shows a block diagram of a polygon processor for Bezier polygons composed of straight lines.

FIG. 11 shows a block diagram of a polygon processor for a polygon whose sides are formed by first-order Bezier curves. Such a circuit can be realized in a special purpose processor. Only the section relating to the x-coordinate is shown. For the y-coordinate a corresponding device is provided or the same device is used in time multiplex. The program control has been omitted for the sake of simplicity, merely the data paths being shown. First the registers 240 and 242 are loaded with the x-coordinate of a describing point (in this case a terminal point) of the relevant polygon side and that of the point to be tested. The width of the data paths is each time shown in bits. The coordinates of the points consist of N bits; this is determined by the dimensions of the processing field 100 in FIG. 5. In arithmetic element 244 first the difference between the two x-coordinates is determined. The relevant data path has a width of N bits, increased by one sign bit. If the difference has the value +1,0, or −1, it may be that the point in question coincides with the relevant terminal point of the polygon side, or is situated in an elementary circumscribing rectangle which is determined by that terminal point. The register 248 comprises a bit position for each of the above three cases. Furthermore, during a second operation the result of the operation is transferred, together with the content of the register 248, to the register 250/252 via a data path having a width of N+4 bits; the latter register thus contains the relative x-coordinate of the first terminal point of the relevant polygon side. Subsequently, the same operation is repeated for the other terminal point of the relevant polygon side, the result being stored in the register 254/256. Similarly, the y-coordinates of the terminal points of the relevant polygon side are treated. A detection circuit (not shown) can then perform the tests stated on the lines 204, 205, 212 in FIG. 8. In some cases the treatment of the relevant point may now have been completed, that is to say if the point in question is situated outside the rectangle diagonalized by the polygon side, or if a decision can be directly taken as regards the inside/outside information. For the implementation of the further lines of FIG. 8, the multiplexers 258, 260 are subsequently made to conduct the contents of the registers 250-256, supplemented by a least-significant "1"-bit as obtained from a signal source (not shown). Subsequently, the center of the relevant polygon side is determined: the relative x-coordinates are applied to the adder 270. The sum is temporarily stored in the register 272; the sum again represents a relative value. The function of block 274 corresponds to that of block 246. Furthermore, the test result on line 221 in FIG. 8 determines which of the two registers 262-268 is to be the destination. The point to be treated must then again be situated in the rectangle diagonalized by the polygon side portion. The x-coordinates as well as the y-coordinates of both terminal points of said portion must then have an opposite sign. The operation thus continues until the end of the list of instructions of FIG. 8 is reached.

Figure 12:
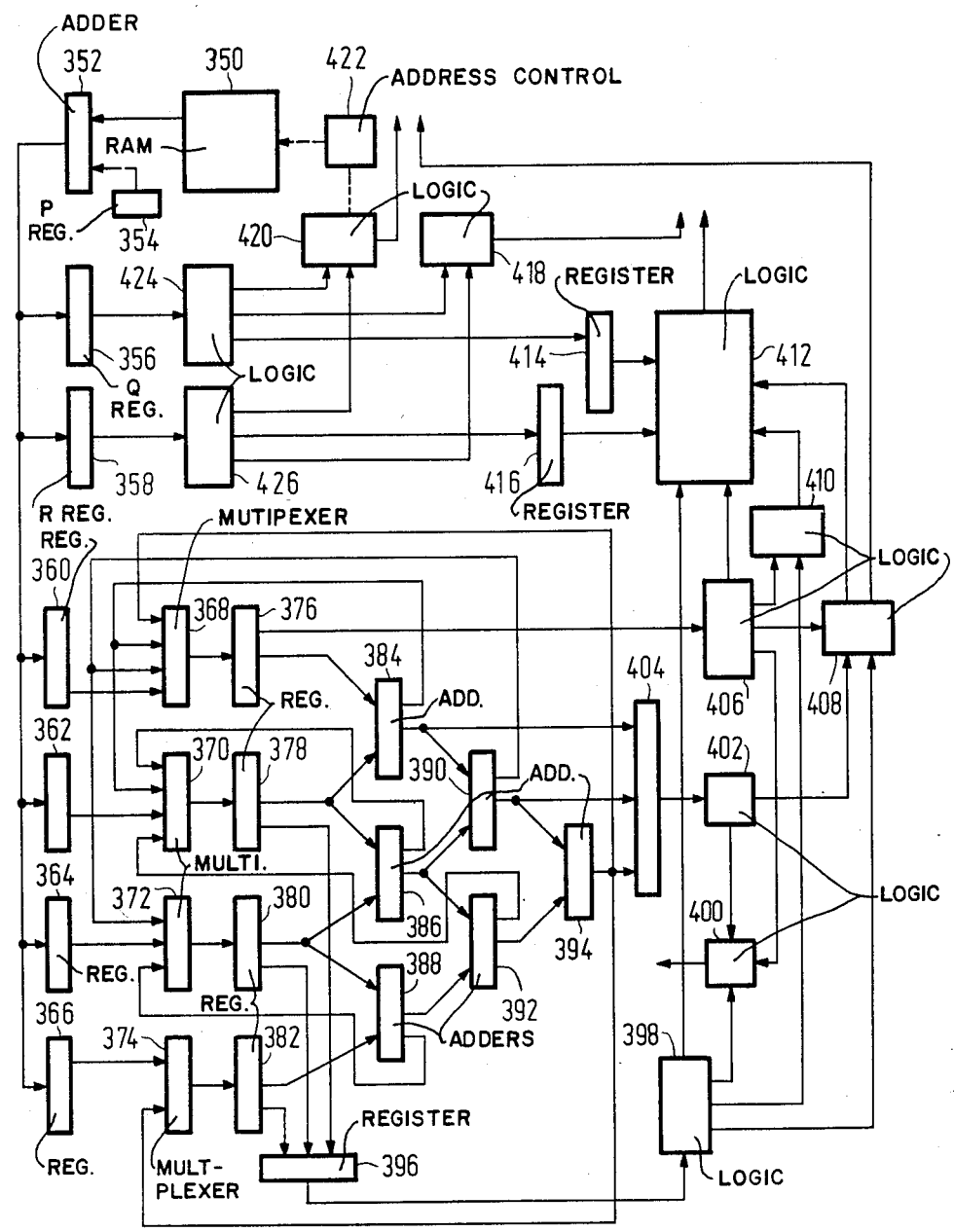
FIG. 12 shows a block diagram of a polygon processor for Bezier polygons whose sides are formed by Bezier curves of at the most the third order.

FIG. 12 shows a block diagram of a polygon processor for Bezier polygons whose sides are formed by Bezier curves of the third order at the most. The data source is a random access memory 350, for example the auxiliary memory in question in which the relevant elementary object elements are provided with a relevance bit for the polygon processor in question, said relevance bit being set by the structure processor. In the case of a large and complex data structure, the data structure itself can be taken as an indicator: only object elements which themselves comprise a relevance bit can refer to an object element which could be provided with such a relevance bit at a lower level in the hierarchy. If several point processors operate on the same data structure, first an abstract is made for storage in the auxiliary memory. Subsequent, each of the point processors in question makes its own copy of this abstract, so that the reduction processor can make a new abstract while the point processors perform their operations. Register 354 outputs the coordinate of the pixel in question. Adder 352 corresponds to the element 244 in FIG. 11. The relative coordinates of the starting point Q and the terminal point R of the relevant polygon side are applied to registers 356, 358. Logic circuit 420 tests whether the point to be examined coincides with one of the two terminal points (FIG. 8, line 205, so this is determined for two coordinates together), and if so, the variable "at" is adjusted and the relevant polygon is ready. If necessary, the next polygon in the memory 350 is addressed. Furthermore, if the point is situated outside the circumscribing rectangle (line 204), a control signal is applied to progress control element 422 in order to address the next side of the relevant polygon. Furthermore, logic circuit 418 tests the condition INBOX2 (Q,R), FIG. 8, line 231. The variable "in" may then become "true". Furthermore, the relative coordinates of the at the most four describing points are successively applied to registers 360-366. Elements 368-374 are multiplexers comprising 2-4 inputs. Elements 376-382 are registers which correspond to the elements 250/2 and 254/6. The blocks 384-394 represent a tree structure of accumulators for determining one or more new describing points of a polygon side portion. Element 404 is a multiplexer for conducting the output number (Et) which is given by the order of the relevant Bezier curve. For a first-order curve, this element is 384, and so on. Element 396 is a multiplexer for conducting the coordinate of the last describing point. Block 402 is a logic circuit for applying the correct information of Et to further logic circuits (400, 408). The same is applicable to the logic circuits 406, 398 with respect to the two terminal points of the polygon side (portion). The coordinates of the first and the last describing point are thus applied to the logic circuits 406 and 398, respectively. The logic circuit 400 tests INBOX1 (Eq,Et) or INBOX1 (Er,Et). If one of these two is true, the multiplexers 368, 370, 372, 374 can conduct the contents of the adders containing the data of the subsequently relevant describing points (test on lines 222, 224). Logic circuit 410 tests (line 212) whether the two describing points form an elementary circumscribing rectangle, so that the situation of FIGS. 10d,e,f can occur (line 212). Logic circuit 408 tests whether the newly found point Et coincides with the point in question, i.e. a test similar to that performed in the logic circuit 420. If the point in question is situated outside the two rectangles described by terminal points and new center point, the logic circuit 412 performs the test of line 228; on the basis thereof the information "in" could be changed. The information concerning the points Q,R necessary for this purpose has already been received from the registers 356, 358 by way of selective logic circuits 424, 426. The elements 414, 416 form registers therefor.

Supplements for a Three-Dimensional Situation

Figure 4:
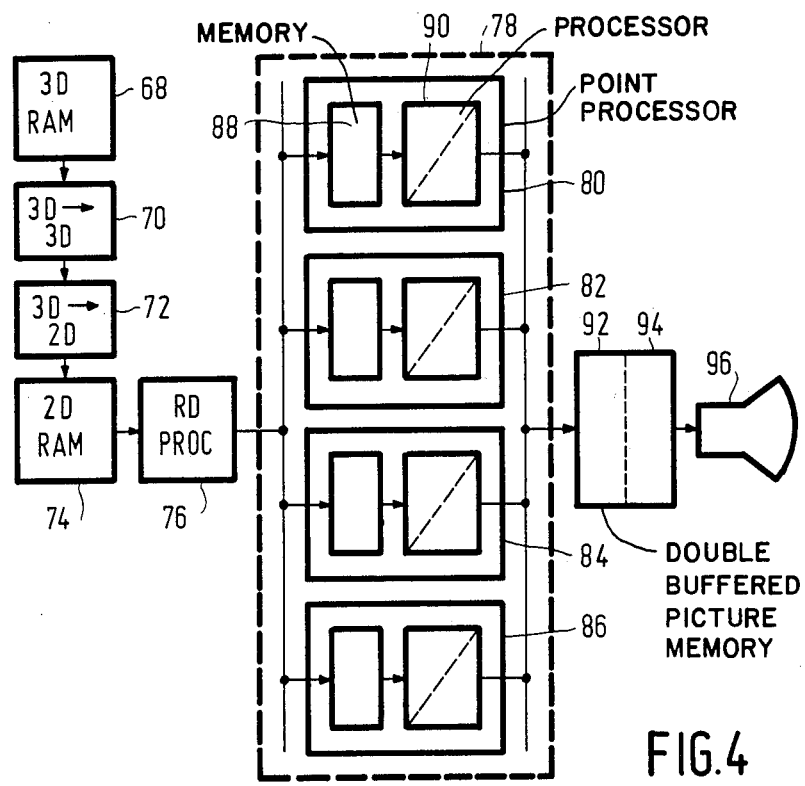
FIG. 4 shows a symbolic diagram of a multi-processor system.

First of all, in a three-dimensional situation all object elements may still be given as flat polygons; all describing points thereof, therefore, comprise a third coordinate which is also stored in the memory 68 in FIG. 4. After transformation by means of the element 70, the equation of this plane is determined and the parameters of the equation of this plane are stored in the memory 74 as priority information for the object elements transformed by means of the element 72. During the processing by the reduction processor, the entire information of the relevant object elements is stored in the auxiliary memory in question. If it is detected that two or more polygons overlap a given point after execution of the previously described operations in the structure processor and the polygon processor, the problem of coloring is solved as follows. It is to be noted that this can be exactly performed in the case of parallel projection in that only the describing points of the polygons in question are transformed to the two-dimensional situation, after which the described polygon processing is executed. The two planes in which the polygons are situated are given by the parameters of the parameter equation of the planes a,b,c,d and a',b',c',d', respectively, the equation of the first lane being: ax+by+cz+d=0, and that of the second plane a'x+b'y+c'z+d'=0, the signs of d and d' each time being the same (this is not an actual restriction). The current point is given by its coordinates, C,D,T, i.e. the intersection of the line of viewing and the picture plane, so that the value of T is invariable for all pixels. In the eye system of coordinates the equations of the projection straight line for the current pixel are as follows:

in the case of parallel projection:
x=C, y=D, z=kT (k may have any value),
so that for the polygons in question the parameter values of k for the points of intersection with respect to the line of viewing are found as:
$k=(-d-a\cdot C-b\cdot D)/(c\cdot T)$, and
$k'=(-d'-a'\cdot C-b'\cdot D)/(c'\cdot T)$.

in the case of central projection:
x=kC, y=kD, z=kT (k may have any value):
$k=(-d)/(a\cdot C+b\cdot D+c\cdot T)$, and
$k'=(-d')/(a'\cdot C+b'\cdot D+c'\cdot T)$.

However, only the relative values of the parameter k are of importance and, inter alia because each time a positive value of the coefficient d was chosen, this determination can be performed after solution of the above relations by multiplication (so that no division is required). The smallest value of k or k' indicates the polygon for which the information "inside" had the highest priority and for which, consequently, coloring must be performed. If more than two polygons are relevant for the pixel in question, the decision is successively taken pair-wise for all polygons, each time only the most relevant one of the two being retained for the further treatment.

In the foregoing flat Bezier figures have been considered. The extension to three dimensions is performed in that the Bezier curves then extend in two bundles which can be represented as a double product, while in FIG. 1b they necessitated only a single product.

LIST OF COMMANDS

130: STRT
132: STO XL, XR, YB, YO
134: CALLDATSTRUCT RESET RELBITS
136: CREATE GLOBAL STACK
138: CALL EXAMINE
140: STORE RELEVANT INFO+STOP
142: STRT
144: OVERLAP?
146: PUSH PRESENT ADDRESS ON GLOBAL STACK BRA:=0
148: BRA=BRA+1
150: OVERLAP?
152: PUSH PRESENT ADDRESS ON GLOBAL STACK
154: LOWEST?
156: SET REL BITS OF GLOBAL STACK ADDRESS
158: POP WHOLE OF GLOBAL STACK
180: LAST BRA?
182: POP GLOBAL STACK ONE
184: RETURN
186: SAVE LOCAL VARIABLES
188: RECALCULATE+CHECK COORDINATES BY INVERSE TRANSFORM
190: CALL EXAMINE
192: POP GLOBAL STACK ONE

What is claimed is:

1. A picture generation method, said method comprising the steps of:
   (a) starting from a hierarchically organized data structure of object elements, said data structure on an elementary level comprising object elements in the form of Bezier polygons, each such polygon being exclusively defined by the describing points of its polygon sides (300/302, 310/312/314, 322/324/326/328) and which object elements are linked on next-higher hierarchic level by a relative transformation functions so as to form object elements of said next-higher level, until a highest hierarchic level a two-dimensional data structure is produced (66);
   (b) storing said data structure in the form of object elements and two-dimensional relative transformations;
   (c) defining a display field and dividing this display field into a plurality of rectangular subfields of equal dimensions, and assigning each pixel of a predetermined subfield to a point processor of an array of point processors (80-86);
   (d) for each pixel starting from the highest level and progressively for each next-lower level of the data structure, determining the point's application coordinates for the point which corresponds to the pixel within any object element of that level until such object element is either found to be irrelevant for the point in question or is found to be an elementary object element;
   (e) for each current point, calculating for each elementary object element relevant for such current point a binary inside/outside indicator and generating a list of all relevant elementary object elements for which the "inside" value applies with respect to the current point, associated with the object element's color information;
   (f) in case of a list of more than one elementary object element thus generated determining a priority among the latter object elements and therefrom producing a color information for the pixel in question; and
   (g) outputting said pixel color information for cyclical interrogation by a display element.

2. A multiprocessor computer system as claimed in claim 1, characterized in that each elementary object element in the input memory includes a priority indication.

3. A multiprocessor computer system as claimed in claim 2 for the display of a three-dimensionally organized data structure in central projection or parallel projection, characterized in that for said elementary object elements which are defined therein as said polygons an implicit priority indication is given by equation parameters of the plane which at least partly contains the elementary object element in question, in the case of polygons which locally overlap after projection on the viewing plane, the parameter value of the points of intersection of locally associated planes with respect to a straight line along the projection direction, as expressed in parameter form, and through a projection point, explicitly providing relative priority upon comparison.

4. A method as claimed in claim 1, admitting only polygon sides that are monotonic in X and Y directions, wherein in step e the inside/outside information is computed in the following steps:
- (a') treating all polygon sides in sequence until none are left or a coincidence with a polygon side (AT-SIDE) is detected; in the latter case, exiting the algorithm via step j';
- (b') computing for each polygon side the contribution to the coincidence with the contour in conjunction with the contribution of said side in the parity of the number of intersections with a half line through the current point for which the inside/outside information has to be found;
- (c') in the simple case of a side around which a parallelogram can be constructed (having the curve end points in opposite corners and its sides being parallel to rows and columns of point locations) that is not enclosing the current point, wherein no AT-SIDE can occur, detecting the contribution to the number of intersections on the basis of the relative position of the curve endpoints with respect to the current point (opposite y-coordinates and negative x-coordinates toggling the parity of the number of intersections);
- (d') in the more complex case of a side with said parallelogram enclosing the current point, checking first coincidence with the curve end points, in case of positive result ATSIDE is true, proceeding directly t step j';
- (e') otherwise subdividing further the side into two halves, unless the side is already primitive (the curve end points at distance one) in which case computing the contribution to the number of intersections from the relative position of the end points with respect to the current point; in which case proceeding with the next polygon side in step b';
- (f') in the case in which a real subdivision occurs, making use of the subdivision theorem of Bezier curves to compute the midpoint along the side, and testing on coincidence of this midpoint with the current point; said coincidence leading directly to the ATSIDE information and branching to step j';
- (g') otherwise having constructed two subsides, of which at most one can enclose the current point (due to the monotonicity constraint on the sides), treating said portion iteratively starting from step e';
- (h') if none of the two portions encloses the current point, computing the contribution to the number of intersections as in step c';
- (i') proceeding with the next polygon side in step b'; if no side is left, proceeding to step j'; and
- (j') combining the ATSIDE information with an OR-function with the parity of the number of intersections generated in the preceding steps to obtain the inside/outside information.

5. A method as claimed in claim 4, wherein said semi-infinite line is parallel to one side of said parallelogram.

6. A method as claimed in claim 1, wherein in step g said priority is determined on the basis of a priority indication assigned to each elementary object element.

7. A method as claimed in claim 6, wherein for the display of a three-dimensionally organized data structure in central or parallel projection said priority indication contains equation parameters of a plane which contains at least a part of the elementary object in question, and wherein the priority determination is executed by comparing a parameter value of an intersection point of a straight line along the projection direction with said plane, as expressed in parameter form, with the parameter of at least one other such intersection point.

8. A multiprocessor computer system for forming a picture on a display field of a display member from object elements which are defined in a hierarchic data structure, said system comprising:
- (a) a connection for a host processor;
- (b) an input memory (74) fed by said connection for storing elementary level object elements in the form of respective Bezier polygons each of which is exclusively defined by the describing points of its polygon sides and furthermore storing for each next-higher hierarchic level two-dimensional transformation functions that form object elements of said next-higher level, up to a highest hierarchic level having a two-dimensional data structure;
- (c) an array of point-processors (80, 82, 84, 86) fed in parallel by said input memory and being each assigned to a rectangular subfield of said display field, each of said point processors having state-sequencing means, for operating in a first state as a structure processor for determining, for each assigned point starting from the highest level and progressively for each next-lower level of the data structure, the application coordinates of said assigned point within any object element of that level until such object element is either found to be irrelevant for the point in question or is found to be an elementary object element; for operating in a second state as a polygon processor for calculating, for each elementary object element thus found in a first state a binary inside/outside indicator and generating a list of all relevant elementary object elements for which an "inside" value applies with respect to the current point, associated with such elementary object's color information; and for operating in a third state, in case of a list of more than one elementary object element thus generated, as a priority processor for determining a priority among the latter object elements and producing therefrom a color information for the pixel in question; and
- (d) a cyclically operable multiplexer (176) for receiving the color information generated by the point-processors for forwarding to said display member.

9. A multiprocessor computer system as claimed in claim 8, wherein the array of point-processors is divided into sub-arrays (166–174), all point-processors of a sub-array being assigned to an identical rectangular subfield of said display field, each sub-array having an auxiliary memory (162) connected to its point-processors via a cyclically operable demultiplexer; and a reduction processor (76) is provided which is connected between said input memory and said auxiliary memory to determine from the hierarchic data structure the relevance of each object element for said assigned subfield starting from the highest level of said data structure, and levelwise descending therein until irrelevance of said object element is detected or until an elementary object element is reached, selecting for transfer to said auxiliary memory only such part of the data structure containing at least one relevant elementary object element plus a set of all object elements detected as being relevant and hierarchically related to said elementary object elements.

10. A multiprocessor computer system as claimed in claim 9, wherein said reduction processor has means for detecting said relevance on the basis of at least partial coincidence between the relevant subfield and a rectangular bounding box which is stored in said input memory for each object element of said data structure and which bounding box encloses said object element in question.

11. A multiprocessor computer system as claimed in any one of claims 8 to 10, characterized in that between the array of point processors and the display member there is connected a double picture buffer (92/94) which comprises an input section for receiving color information concerning a complete picture from the point processors, and an output section for storing the color information concerning a complete picture for output to the display member until the input section, after having been filled with the information of a complete picture, is switched over so as to act as the output section, the output section acting as such thus far then being switched over so as to act as the input section.

12. A multiprocessor computer system as claimed in claim 11, wherein the output of said priority processor contains equation parameters of a plane which contains at least a part of said elementary object in question, and having means to execute the priority determination by comparing a parameter value of an intersection point of a straight line along the projection direction with said plane, as expressed in parameter form, with the parameter of at least one other intersection point.

* * * * *